(12) United States Patent
Raoul

(10) Patent No.: US 8,037,784 B2
(45) Date of Patent: Oct. 18, 2011

(54) DRIVE TRAIN COMPRISING AN AUXILIARY ENGINE WHICH IS CONNECTED TO A COUNTERSHAFT OF THE TRANSMISSION

(75) Inventor: Michel Raoul, Elancourt (FR)

(73) Assignee: Renault S.A.S., Boulogne Billancourt (FR)

( * ) Notice: Subject to any disclaimer, the term of this patent is extended or adjusted under 35 U.S.C. 154(b) by 513 days.

(21) Appl. No.: 12/161,864

(22) PCT Filed: Jan. 24, 2007

(86) PCT No.: PCT/FR2007/050687
§ 371 (c)(1),
(2), (4) Date: Oct. 16, 2008

(87) PCT Pub. No.: WO2007/085765
PCT Pub. Date: Aug. 2, 2007

(65) Prior Publication Data
US 2009/0272213 A1    Nov. 5, 2009

(30) Foreign Application Priority Data
Jan. 25, 2006  (FR) ...................................... 06 00678

(51) Int. Cl.
*F16H 37/06*    (2006.01)
(52) U.S. Cl. ............................... 74/661; 74/330; 74/331

(58) Field of Classification Search ........................ None
See application file for complete search history.

(56) References Cited

U.S. PATENT DOCUMENTS
2005/0139035 A1 *  6/2005  Lee et al. ........................ 74/661

FOREIGN PATENT DOCUMENTS

| | | |
|---|---|---|
| EP | 0 845 618 | 6/1998 |
| EP | 1 199468 | 4/2002 |
| EP | 1273825 | 1/2003 |
| FR | 2821652 | 9/2002 |
| FR | 2 822 758 | 10/2002 |
| FR | 2 869 571 | 11/2005 |
| WO | WO 2005/065 976 | 7/2005 |

* cited by examiner

*Primary Examiner* — Roger Pang
*Assistant Examiner* — Jacob S Scott
(74) *Attorney, Agent, or Firm* — Oblon, Spivak, McClelland, Maier & Neustadt, L.L.P.

(57) ABSTRACT

A drive train for a motor vehicle including a main engine, an auxiliary engine, and a parallel shaft transmission. The transmission includes: at least one input shaft connected to the main engine by a clutch device, at least one output shaft including a drive pinion that engages with a differential ring gear, a countershaft that is not coaxial with the input and output shafts, and a plurality of synchronizers configured to connect the input shaft to the output shaft selectively in rotation. The countershaft is fitted with a drive wheel connected to the auxiliary engine and that is permanently rotatably linked to the input shaft.

20 Claims, 3 Drawing Sheets

DRIVE TRAIN COMPRISING AN AUXILIARY ENGINE WHICH IS CONNECTED TO A COUNTERSHAFT OF THE TRANSMISSION

BACKGROUND

The invention relates to the field of motor vehicle drivetrains and in particular to the field of drivetrains having a main engine, an auxiliary engine and a parallel shaft transmission.

In this field, patent application WO 2005/065 976 (EATON CORPORATION) has described a transmission comprising a solid primary shaft and a hollow primary shaft which are coaxial and connected to a first engine by a double clutch. The hollow primary shaft comprises splines rotationally driven by a rotor belonging to a second engine. The transmission ratios are established by dog-clutch synchromeshes. The sequences for shifting from one transmission ratio to the next involve two steps. A first step in which the dog-clutch synchromesh of the next transmission ratio is engaged, then a second step in which the engine torque is switched from one primary shaft to the other primary shaft. This allows the shift to be performed under torque. In a transmission such as this, the size of the second engine is combined with the length of the transmission. The reverse-gear, second-gear and fourth-gear ratios are activated by the solid primary shaft. When one of these ratios is engaged, an additional clutch allows the second engine to be connected to the first engine. The additional clutch is of a size which further increases the length of the transmission.

BRIEF SUMMARY

The invention proposes a drivetrain having a main engine and an auxiliary engine, which overcomes the above disadvantages especially in that the auxiliary engine can be connected either to the main engine or to the wheels of the vehicle, or to both simultaneously, and this can be done for all the transmission ratios and without the need for an additional clutch.

According to one embodiment of the invention, the drivetrain for a motor vehicle is equipped with a main engine, with an auxiliary engine and with a parallel shaft transmission. The transmission comprises at least one primary shaft connected to the main engine by a clutch device, at least one secondary shaft equipped with a drive pinion meshing with a differential ring gear, an intermediate shaft that is not coaxial with the primary and secondary shafts, and a plurality of synchromeshes capable selectively of causing a primary shaft to rotate as one with a secondary shaft. The intermediate shaft is equipped with a drive wheel connected to the auxiliary engine and permanently connected in terms of rotation to the primary shaft or shafts.

If there is just one primary shaft, then the drive wheel is connected to this primary shaft. If there are several primary shafts connected to the main engine by a clutch device, then the drive wheel is rotationally connected to each of the primary shafts.

It will be appreciated that, in a drivetrain such as this, the auxiliary engine can be connected to the main engine, and not to the wheels of the vehicle, when no synchromesh is forming a connection between one of the primary shafts and one of the secondary shafts, and when the clutch device is establishing a connection between the main engine and one of the primary shafts. The auxiliary engine can also drive the wheels of the vehicle in all the transmission ratios, without being connected to the main engine. To do that, no clutch makes a connection between the main engine and one of the primary shafts, and at least one of the synchromeshes makes a connection between one of the primary shafts and one of the secondary shafts. The auxiliary engine may also drive the wheels of the vehicle in all the transmission ratios while at the same time also being connected to the main engine. In this drivetrain there is no need to actuate a clutch additional to the clutch or clutches used for driving the primary shaft or shafts.

In an alternative form of embodiment, the drivetrain comprises a computer-controlled transmission equipped with at least one motorized actuator for controlling the synchromeshes and/or the clutch device.

Advantageously, the transmission comprises a main primary shaft and an auxiliary primary shaft each selectively connected to the main engine by the clutch device, the drive wheel being fixedly mounted on the intermediate shaft, which intermediate shaft is equipped with a pair of fixed step-down pinions, one of them meshing with a fixed pinion belonging to the main primary shaft, and the other meshing with a fixed pinion belonging to the auxiliary primary shaft.

Advantageously, the clutch device has a main engaged position in which the main primary shaft is synchronized with the main engine, a neutral position in which no primary shaft is connected to the main engine, and an auxiliary engaged position in which the auxiliary primary shaft is synchronized with the main engine.

Advantageously, the intermediate shaft is equipped with an intermediate reverse-gear pinion in mesh with a reverse-gear pinion mounted on the secondary shaft, a reverse-gear synchromesh being mounted either on the intermediate shaft or on the secondary shaft. The rotational speed of the drive wheel may be greater than the rotational speed of the intermediate reverse-gear pinion.

Advantageously, the drivetrain comprises means of attachment of the auxiliary engine. The drive wheel and a rotor belonging to the auxiliary engine are connected by a chain. The rotational speed of a rotor of the auxiliary engine may be greater than the rotational speed of the primary shaft or shafts.

Advantageously, the main engine is a combustion engine and the auxiliary engine is a generator capable of converting mechanical energy into some other form of energy, particularly electrical energy.

According to one alternative form of embodiment, the transmission comprises a double dog-clutch synchromesh mounted on one of the secondary shafts, contributing to the reverse-gear ratios and to the first-gear ratio, a freewheel being interposed between a sliding gear of said synchromesh and a first-gear idler pinion, the first-gear pinion being the closest pinion on the secondary shaft to the drive pinion.

According to another alternative form of embodiment, the transmission comprises a double synchromesh and a single synchromesh of the friction cone type mounted on one of the primary shafts, said double friction-type synchromesh contributing to at least three forward-gear ratios.

According to one particular embodiment of the invention, the transmission has five forward-gear ratios. The double friction-type synchromesh and the double dog-clutch synchromesh are actuated by a first motorized actuator with two different selection positions. The single friction-type synchromesh engages a second-gear pinion situated on the same side of said single synchromesh as the clutch device, said single synchromesh and the clutch device being actuated by a second motorized actuator.

According to one particular embodiment of the invention, The transmission has six forward-gear ratios. The double friction-type synchromesh and the double dog-clutch synchromesh are actuated by a first motorized actuator with two different selection positions. The single friction-type synchromesh engages a second-gear pinion situated on the opposite side of said single synchromesh with respect to the clutch device, said single synchromesh and the clutch device being actuated by a second motorized actuator with one and the same selection position.

BRIEF DESCRIPTION OF THE DRAWINGS

Further features and advantages of the invention will become apparent from reading the detailed description of a number of embodiments taken by way of nonlimiting examples and illustrated by the attached drawings in which.

DETAILED DESCRIPTION

Figure 1:
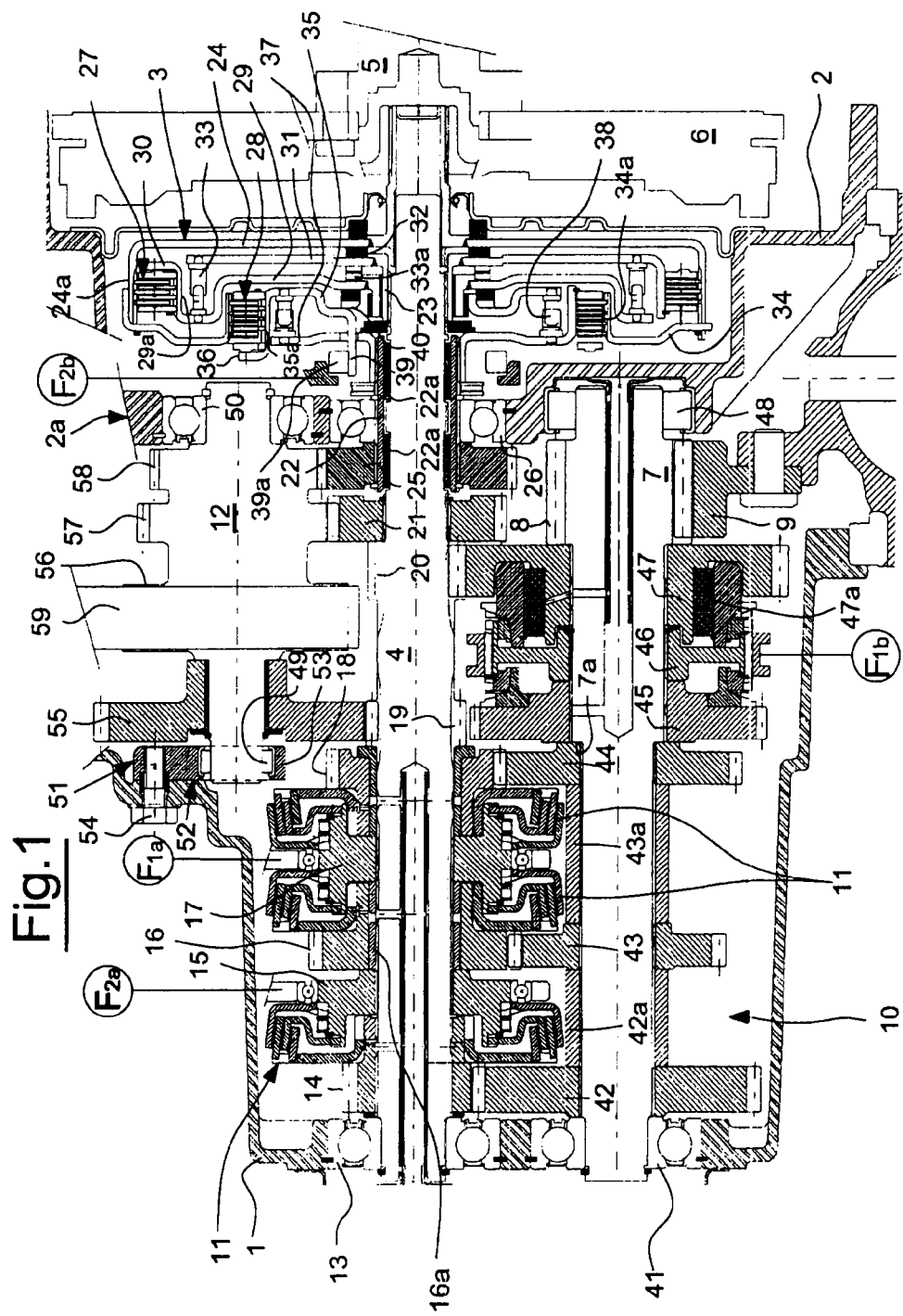
FIG. 1 is a longitudinal section on I-I of FIG. 2, of a first embodiment of a six-speed hybrid computer-controlled transmission.

As illustrated in FIG. 1, one embodiment of a vehicle drivetrain comprises a transmission equipped with a main casing 1 and with a clutch casing 2. A clutch device 3 connects a main primary shaft 4 to a crankshaft 5 of a combustion engine, not depicted, via a flywheel 6, depicted in outline in FIG. 1. A secondary shaft 7 is equipped with a drive pinion 8 meshing with a differential ring gear 9 and is thus connected permanently to the wheels of the vehicle.

The main primary shaft 4 extends over the entire length of the transmission, from one side of the transmission containing the clutch device 3 to an end region 10 containing a plurality of synchromeshes 11. The transmission also comprises an intermediate shaft 12, parallel to and not coaxial with the main primary shaft 4 and the secondary shaft 7.

The main primary shaft 4 comprises, in succession, from left to right in FIG. 1, a ball bearing 13, an idler pinion 14 for the second transmission ratio, which for simplification will be termed the "second-gear pinion" 14, a single synchromesh body 15 mounted on splines, an idler pinion 16 for the fourth and sixth transmission ratios which for simplicity will be termed the "fourth- and sixth-gear pinion" 16 mounted on a ring 16a, a double synchromesh body 17 mounted on splines, an idler pinion 18 for the third or fifth transmission ratios, which for simplicity will be termed the "third- and fifth-gear pinion" mounted on a ring, a reverse-gear tooth set 19, a first-gear tooth set 20, a first step-down pinion 21 mounted on splines, an auxiliary primary shaft 22 in the form of a sleeve mounted on two needle bearings 22a, a sleeve 23 mounted on splines, and an external bell housing 24 enclosing the clutch device 3 and mounted such that it is free to rotate.

The auxiliary primary shaft 22 receives, in succession, from left to right in FIG. 1, a second step-down pinion 25 secured by splines to the sleeve 22, a ball bearing 26 and splines for driving the clutch device 3. The auxiliary primary shaft 22 is coaxial with the main primary shaft 4 with respect to which it can rotate on the bearings 22a.

The clutch device 3 comprises a main multiple-disk assembly 27 connecting the external bell housing 24 to the main primary shaft 4 and an auxiliary multiple-disk assembly 28 driving the auxiliary primary shaft 22. The two multiple-disk assemblies 27 and 28 are coaxial. The auxiliary multiple-disk assembly 28 is axially offset slightly with respect to the main multiple-disk assembly 27, on the auxiliary primary shaft 22 side.

The main multiple-disk assembly 27 comprises a plurality of external disks which are connected in terms of rotation to the external bell housing 24 by pegs collaborating with a slot formed in a skirt 24a of the external bell housing 24. The main multiple-disk assembly 27 also comprises a plurality of internal disks, interposed with the plurality of external disks and which rotate as one with a main piston 29 by virtue of pegs on each of the disks of the plurality of internal disks, collaborating with slots. The two pluralities of disks of the main disk assembly 27 are capable of translational movement between the skirt 24a of the external bell housing 24 and a corresponding cylindrical part 29a of the main piston 29. The external bell housing 24 comprises an axial thrust bearing, not depicted, that prevents the plurality of external disks from moving to the left in FIG. 1. The main piston 29 comprises an axial thrust bearing 30 situated to the right of the main multiple-disk assembly 27 and capable of pressing the main multiple-disk assembly 27 against the axial thrust bearing of the external bell housing 24.

The main piston 29, capable of moving axially, rotates as one with a main internal bell housing 31 secured to the sleeve 23 and driving the main primary shaft 4. A needle thrust bearing 32 is positioned axially between the external bell housing 24 and the main internal bell housing 31. A main assistance device 33 is positioned axially between the main internal bell housing 31 and the main piston 29.

The auxiliary multiple-disk assembly 28 is made up of a plurality of external disks and of a plurality of internal disks, interposed with one another. The external disks are secured to an auxiliary external bell housing 34 surrounding the assistance device 33 and the main multiple-disk assembly 27. The auxiliary bell housing 34 is rigidly attached to the main external bell housing 24. The internal disks rotate as one with an auxiliary piston 35. The two pluralities of auxiliary disks are capable of translational movement along the axis of the clutch device 3 by virtue of slots formed in skirt parts 34a of the auxiliary external bell housing 34 and 35a of the auxiliary piston 35.

The auxiliary external bell housing 34 comprises an axial thrust bearing, not depicted, located to the right of the auxiliary multiple-disk assembly 28. The auxiliary piston 35 comprises an axial thrust bearing 36 allowing the auxiliary multiple-disk assembly 28 to be pressed toward the thrust bearing of the auxiliary bell housing 34. The auxiliary piston 35 rotates as one with an auxiliary internal bell housing 37 by virtue of auxiliary assistance devices 38. An axial needle thrust bearing 40 is positioned axially between the main piston 29 and the auxiliary piston 35. The auxiliary piston 35 has operating fingers 39 extending axially and passing through the auxiliary internal bell housing 37. The operating fingers 39 can be actuated by an operating fork F2b of the clutch device 3 via a ball bearing 39a. The auxiliary internal bell housing 37 drives the auxiliary primary shaft 22 via splines.

The way in which the clutch device 3 works will now be described. The assembly comprising the clutch operating fork F2b, the auxiliary piston 35, and the main piston 29 forms an assembly capable of axial movement and compressed by the pressing device 33a.

When the clutch operating fork F2b is not actuated, the pressing device 33a keeps the main 29 and auxiliary 35 pistons in the left-most position in FIG. 1. The main multiple-disk assembly 27 is in the compressed state and the auxiliary multiple-disk assembly 28 is in the uncompressed state. This position is a main position of engagement of the clutch device 3. In this position, the engine is connected to the main primary shaft 4. In this position, there is grip between the main external bell housing 24 and the main internal bell housing 31, thus driving the main primary shaft 4.

When the clutch operating fork F2b is shifted to the right in FIG. 1, the two pistons 29 and 35 together compress the pressing device 33a and allow the external and internal disks of the main multiple-disk assembly 27 to separate from one another without thereby further compressing the auxiliary multiple-disk assembly 28. This position of the fork F2b corresponds to a neutral position of the clutch device 3 in which position the engine is connected neither to the main primary shaft 4 nor to the auxiliary primary shaft 22.

When the clutch operating fork F2b is moved further to the right in FIG. 1, the main multiple-disk assembly 27 continues to be in the free state and the auxiliary multiple-disk assembly 28 is compressed. This position constitutes an auxiliary position of engagement of the clutch device 3 in which position the engine is connected to the auxiliary primary shaft 22.

The pinions of the other shafts of the transmission will now be described. The secondary shaft 7 comprises, from left to right in FIG. 1, a ball bearing 41, a fixed second-gear pinion 42, a spacer ring 42a, a fixed fourth- and sixth-gear pinion 43, a spacer ring 43a, a fixed third- and fifth-gear pinion 44 bearing axially against a shoulder 7a of the secondary shaft 7. The secondary shaft 7 comprises, in succession, from left to right from the shoulder 7a, a reverse-gear idler pinion 45, a dog-clutch synchromesh body 46 mounted on splines, a first-gear idler pinion 47 bearing axially against the drive pinion B. The right-hand end of the secondary shaft 7 is mounted such that it can rotate on a roller bearing 48.

The transmission also comprises an intermediate shaft 12 mounted such that it can rotate on two bearings 49 and 50 situated at each of its ends. The end located on the same side as the clutch device 3 is mounted such that it can rotate on the ball bearing 50 fixed into the clutch casing 2. An attached support 51 comprises a part 52 fixed to the main casing 1 and a part 53 projecting radially into the casing 1. The projecting part 53 accepts the bearing 49. The part 52 is fixed to the main casing 1 by fastening means comprising screws 54.

Because of the existence of the attached support 51, it will be appreciated that the synchromesh 17 can easily be housed in the main casing 1 in spite of the fact that the maximum radial dimension of the synchromesh 17 extends beyond the end of the intermediate shaft 12. The pinions 45 and 47 and the synchromesh 46 corresponding to the reverse-gear and first-gear ratios are transferred onto the secondary shaft 7, in order to allow the intermediate shaft 12 to be brought closer still to the main primary shaft 4.

Because of the means of fastening the attached support 51 to the main casing 1, the intermediate shaft 12 is immobilized irrespective of the direction of the radial loadings applied to it. The intermediate shaft 12 comprises, in succession, from left to right in FIG. 1, an intermediate reverse-gear pinion 55 mounted freely on the intermediate shaft 12, a drive wheel 56, a first step-down pinion 57 and a second step-down pinion 58. The drive wheel 56 and the two step-down pinions 57 and 58 are as one with the intermediate shaft 12. The drive wheel 56 collaborates with a chain 59 connected to a rotor of an auxiliary engine 71 of the vehicle, visible in FIG. 2.

The second step-down pinion 58 has a lower number of teeth than the first step-down pinion 57. When the clutch device 3 is in the main position of engagement, the main shaft 4 has a rotational speed identical to that of the crankshaft 5. The idler pinion 18 can drive the vehicle in third gear. When the clutch device 3 is in the auxiliary position of engagement, the auxiliary primary shaft 22 has a rotational speed identical to that of the crankshaft 5. The main primary shaft 4 is driven at a rotational speed higher than that of the crankshaft 5, and the idler pinion 18 can drive the vehicle in fifth gear.

The single synchromesh 15 and the double synchromesh 17 are of the friction cone type like those described, for example, in French patent application FR-A-2 821 652 to which reference may be made.

The first-gear idler pinion 47 is equipped with a freewheel 47a, as described in patent application EP 1 273 825 (RENAULT).

The double dog-clutch synchromesh 46 is operated by a fork F1b. The double friction-type synchromesh 17 is operated by a fork Fla. The single friction-type synchromesh 15 is operated by a fork F2a and the clutch device 3 is operated by the fork F2b.

The second-gear idler pinion 14 meshes with the fixed second-gear pinion 42 and, with the single synchromesh 15, constitutes a second-gear module. The idler pinion 16 and the fixed pinion 43 together with part of the double synchromesh 17 form a fourth- and sixth-gear module. The idler pinion 18 and the fixed pinion 44, together with the other part of the double friction-type synchromesh 17, constitute a third- and fifth-gear module. The tooth set 19 meshes with the intermediate reverse-gear pinion 55, which also meshes with the reverse-gear idler pinion 45. The tooth set 19, the intermediate reverse-gear pinion 55 and the reverse-gear idler pinion 45 together with part of the double synchromesh 46 constitute a reverse-gear module. The tooth set 20 meshes with the first-gear idler pinion 47 and, with the other part of the synchromesh 46, constitutes a first-gear module. The first step-down pinions 21 and 57 mesh with one another as do the second step-down pinions 25 and 58. All the transmission modules are located within a mechanical assembly delimited, at one end, by the main casing 1 and, at the other, by the wall 2a of the clutch casing 2. The ball bearings 13 and 41 are fixed into the main casing 1. The roller bearing 48 and the ball bearings 26 and 50 are fixed into the wall 2a of the clutch casing 2.

Figure 2:
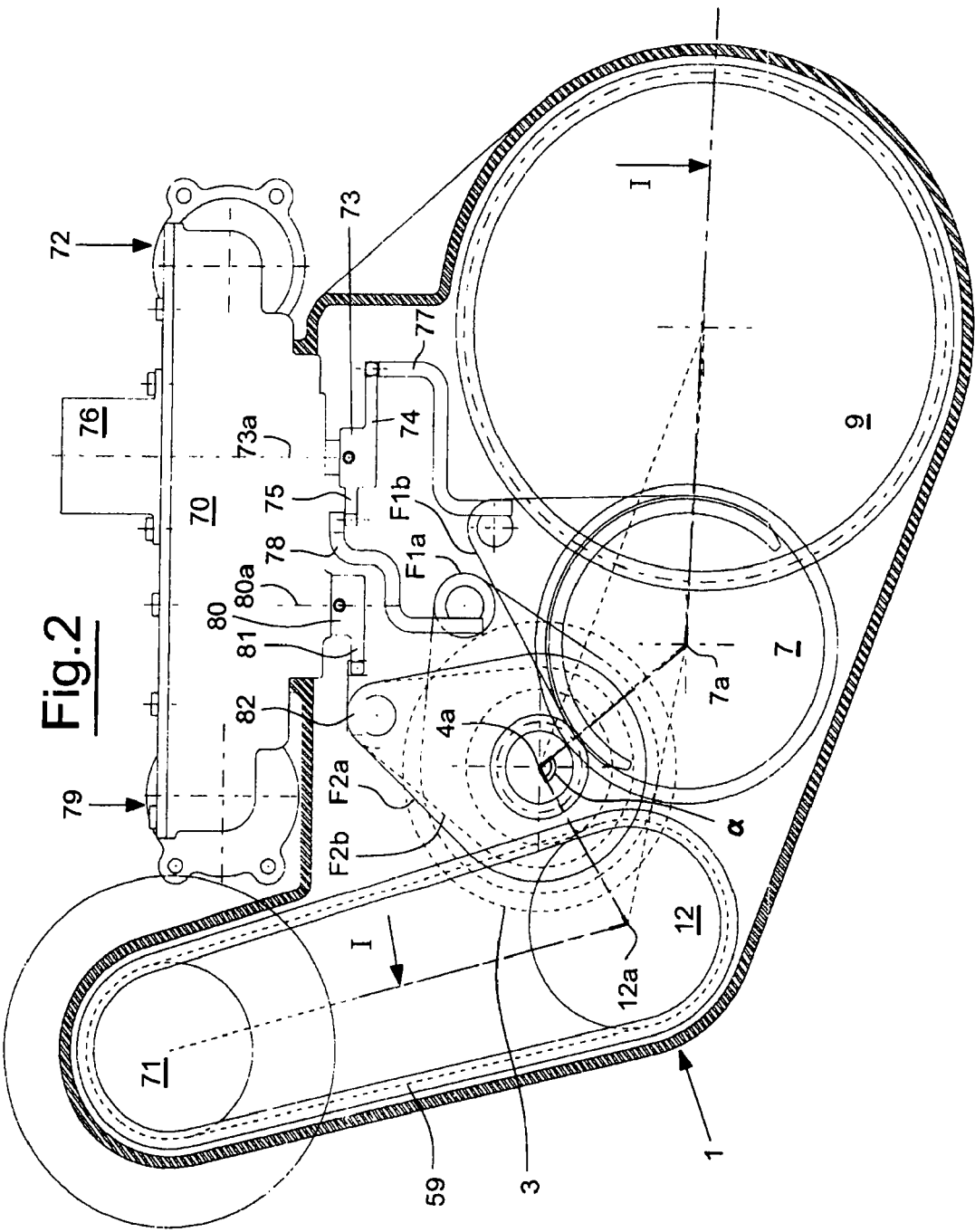
FIG. 2 is a partial cross section of the six-speed hybrid computer-controlled transmission showing the system for controlling the forks.

FIG. 2 shows a control system 70 for operating the drivetrain and the differential ring gear 9, the axis 4a of the main 4 and auxiliary 22 primary shafts and of the clutch device 3, the axis 12a of the intermediate shaft 12, the axis 7a of the secondary shaft 7. The drivetrain comprises an auxiliary engine 71 connected to the intermediate shaft 12 by the chain 59. The auxiliary engine 71 is an electrical machine combining the functions of starter motor, alternator, and drive engine.

The control system 70 comprises a first motorized actuator 72 capable of pivoting a first selector unit 73 about an axis 73a running transversely to the shafts of the transmission. The first selector unit 73 is equipped with a first shift finger 74 and with a second shift finger 75. The first actuator 72 is equipped with a selector device 76 capable of moving the first selector unit 73 translationally between a first selection position illustrated in FIG. 2, in which first position the first shift finger 74 is collaborating with a first fork drive rod 77, and a second selection position, not depicted in FIG. 2, in which second position the second shift finger 75 is collaborating with a second fork drive rod 78. The first fork drive rod 77 drives the fork F1b to actuate the dog-clutch synchromesh 46. The second fork drive rod 78 drives the fork F1a to actuate the double synchromesh 17.

The control system 70 also comprises a second motorized actuator 79 capable of causing a second selector unit 80 to pivot about a transverse axis 80a. The second selector unit 80 is equipped with a shift finger 81 collaborating with a fork drive rod 82 connected, on the one hand, to the drive fork F2a of the single synchromesh 15 and, on the other hand, to the fork F2b that actuates the clutch device 3.

The first actuator 72 drives the forks F1a and F1b alternatively with two different selection positions. The second actuator 79 drives the forks F2a or F2b alternatively.

The way in which the transmission works will now be described. The second-gear idler pinion 14 meshes with the fixed second-gear pinion 42. The fourth- and sixth-gear idler pinion 16 meshes with the corresponding fixed pinion 43. The third- and fifth-gear idler pinion 18 meshes with the corresponding fixed pinion 44. The reverse-gear tooth set 19 meshes with the intermediate reverse-gear pinion 55, which also meshes with the reverse-gear idler pinion 45. The first-gear tooth set 20 meshes with the corresponding idler pinion 47.

Engaging a first-gear or reverse-gear ratio entails first of all actuating the clutch fork F2b so as to bring the clutch device 3 into a neutral configuration. The operation then entails actuating the fork F1b toward the corresponding idler pinion 16 or 18, then returning the fork F2b into the main position of engagement in which the main multiple-disk assembly 27 has its disks engaged with one another.

The shift between first and second gear is done by directly engaging the single synchromesh 15 by moving the fork F2a toward the second-gear pinion 14, that is to say to the left in FIG. 1. This engagement occurs while the fork F1b remains in the first-gear-engaged position. The rotational speed of the secondary shaft 7 is dictated by the second-gear synchromesh 15. The freewheel 47a allows the first-gear idler pinion 47 to have a rotational speed lower than that of the secondary shaft 7. The shift between first and second gear is effected under torque.

When second gear is engaged and the vehicle speed increases, the gearshift to be prepared for is no longer a shift from second gear to first gear but becomes a shift from second gear to a third- or fourth-gear ratio. A computer, not depicted, instructs the first actuator 72 to return the fork F1b to the neutral position and then to change selection position so as to be ready to operate the fork F1a.

The shift between second and third or fourth gear is done by directly engaging the fork F1a toward the corresponding pinion 16 or 18 at the same time as returning the fork F2a to a neutral position. Making the movement whereby the fork F1a is engaged coincide with the movement whereby the fork F2a disengages second gear allows a shift to be performed under torque without the need to use the clutch device 3.

The shift between third gear and fourth gear is performed with a brief interruption in the transmission of torque. The first actuator 72 moves the fork F1b to the left in FIG. 1 and the double synchromesh 17 switches from a configuration in which third gear is engaged into a neutral configuration followed immediately by a configuration in which fourth gear is engaged.

The shift from third gear to fifth gear is performed by leaving the fork F1a engaged with the pinion 18 and moving the fork F2b to the right in FIG. 1. The clutch device 3 switches from a main position of engagement to an auxiliary position of engagement via a transient neutral position. The shift from third to fifth is also a shift with a brief interruption in the transmission of torque.

The same is true of the shift between fourth and sixth gears. The step-down pinions 57 and 58 allow a doubling-up of the ratios established by the double synchromesh 17, acting only on the clutch device 3.

The shift between fourth and fifth gear is performed by making the movement of the fork F1a by the first actuator 72 from the pinion 16 to the pinion 18 via a neutral position coincide with the movement of the fork F2b by the second actuator 79. Having the two gearshift phases of the clutch device 3 and of the double synchromesh 17 coincide with one another means that a shift from fourth gear to fifth gear can be obtained also with a brief interruption in the transmission of torque.

The shift between fifth and sixth gears is performed by moving only the fork F1a and takes place with a brief interruption in the transmission of torque.

In the transmission, the shifts between any two forward-gear ratios are performed either under torque, in the case of gear ratios lower than or equal to third gear, or with a brief interruption in the transmission of torque. The difference between two transmission ratios from third gear upward is smaller than the difference between two transmission ratios from third gear downward. The gearshift times between two brief transmission ratios are practically imperceptible to the driver whose vehicle behaves almost exactly as if it were equipped with a transmission that shifts gear under torque for all these gear ratios. The time during which the transmission of torque is interrupted when shifting gear is a few hundred milliseconds, or even less than 100 milliseconds.

The behavior of the transmission connected, on the one hand, to a combustion engine via the crankshaft 5 and, on the other hand, to the auxiliary engine 71 via the chain 59 will now be described. When the combustion engine and the vehicle are stationary, the start-up phase is effected by positioning the fork F2b into the auxiliary position of engagement, the other forks of the transmission being in their neutral positions. In this configuration, the secondary shaft 7 is not driven by any pinion and the engine torque is passed, with the auxiliary engine 71 acting as a starter motor, to the second step-down pinion 58, to the auxiliary primary shaft 22, and then to the combustion engine, allowing the latter to start.

Conversely, when the vehicle is stationary and combustion engine is running, the engine torque is transmitted either via the auxiliary primary shaft 22 or via the main primary shaft 4 to the auxiliary engine 71 acting as an alternator which can then recharge the vehicle batteries. When first or second gear is engaged, the combustion engine and the auxiliary engine 71 contribute to providing mechanical power to the main primary shaft 4.

When the vehicle is operating in an urban environment, the combustion engine can be switched off and the auxiliary engine 71 alone drives the main primary shaft 4 via the first step-down pinions 21 and 57. Shifting between reverse gear and the first four gear ratios takes place as described hereinabove.

When the vehicle is running on the open road, the auxiliary engine 71 and the combustion engine together contribute to driving the vehicle. When the combustion engine is being used at an engine speed at which its energy efficiency is mediocre, the auxiliary engine 71 provides mechanical power. Conversely, when the vehicle is running down hill, a computer can configure the auxiliary engine 71 so that most of the engine braking is performed by the auxiliary engine 71 and the mechanical energy of the vehicle is converted into electrical energy.

Figure 3:
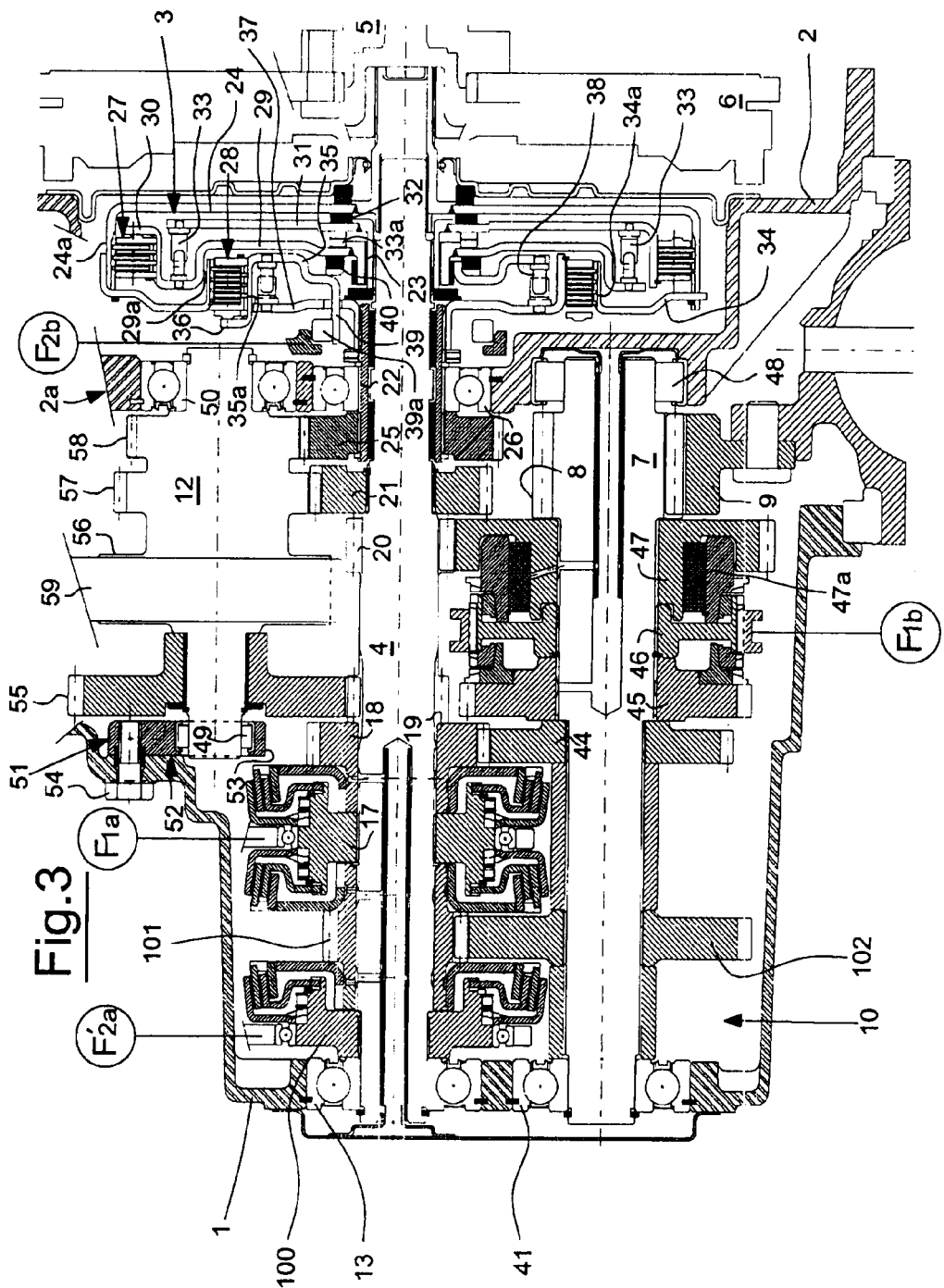
FIG. 3 is a longitudinal section through a second embodiment of a five-speed hybrid computer-controlled transmission.

FIG. 3 illustrates another embodiment of the invention in the form of a hybrid transmission with five forward-gear ratios. This embodiment again includes all the structural features already described in conjunction with FIGS. 1 and 2, except for the features associated with the second-gear, fourth-gear and sixth-gear modules and the way in which these modules are actuated. Parts which are identical or similar bear the same references as in FIGS. 1 and 2.

Only those parts which differ and which correspond to the left-hand part of FIG. 3 will now be described. The main primary shaft 4 comprises, from left to right, the bearing 13, a single friction-cone synchromesh 100 and a second- and fourth-gear idler pinion 101 collaborating, to its left, with a single synchromesh sliding gear 100 and, to its right, with a double synchromesh sliding gear 17. The single synchromesh 100 is actuated by a fork F'2a driven by the second actuator 79 (FIG. 2). The secondary shaft 7 is equipped, from left to right in the figure, with the ball bearing 41, then with a spacer piece, and a pinion 102, mounted on splines of the secondary shaft 7. The remainder of the transmission, illustrated in FIG. 3, is identical to the previous embodiment described with reference to FIGS. 1 and 2.

The pinion 101 meshes with the idler pinion 101. The second actuator 79 is equipped with a selector unit that has two opposing shift fingers that contribute toward pushing two fork drive rods that move along one and the same axis parallel to the shafts of the transmission. When the selector unit of the second actuator 79 rotates in one direction, one of the shift fingers drives a fork drive rod which pushes the fork F2b to the right in FIG. 3. When that same selector unit rotates in the other direction, the other shift finger pulls another drive rod which pulls the fork F'2a also to the right in FIG. 3.

Those aspects of the operation of this transmission which differ from the operation of the transmission already described will now be described. The shift between first gear and second gear occurs under torque by moving the fork F'2a to the right in FIG. 3 while the fork F1b remains engaged. When the engine speed is such that the transmission needs to be placed in a configuration that prepares it for a shift from second to third gear, the fork F1b is returned to the neutral position and the first actuator 72 changes selection position so as to be ready to move the fork F1a to the right in FIG. 3.

During the shift between second gear and third or fourth gear, the second actuator 79 returns the fork F'2a to the neutral position at the same time as the fork F1a is engaged either toward the third-gear idler pinion 18 or to the left in FIG. 3 to synchronize the idler pinion 101. Having these two changes occurring simultaneously means a shift from second gear to third or fourth gear can be performed under torque. The shift from third gear to fourth gear occurs with a brief interruption in the transmission of torque, and the same is true of the shift between third gear and fifth gear.

As in the previous embodiment, the shift between fourth gear and fifth gear involves synchronizing the movement of the fork F1a and of the fork F2b so that the moment that torque is interrupted as a result of the double friction-type synchromesh coincides with the interruption due to the clutch device 3. In this embodiment, the same idler pinion 101 can be synchronized with the main primary shaft 4 either by the action of the first actuator 72 or by the action of the second actuator 79.

The invention claimed is:

1. A drivetrain for a motor vehicle, including a main engine, an auxiliary engine, and a parallel shaft transmission, which transmission includes at least one primary shaft connected to the main engine by a clutch device, at least one secondary shaft including a drive pinion meshing with a differential ring gear, an intermediate shaft that is not coaxial with the primary and secondary shafts, and a plurality of synchromeshes configured to selectively cause the primary shaft to rotate as one with the secondary shaft, the drivetrain comprising:
   a main primary shaft and an auxiliary primary shaft each selectively connected to the main engine by the clutch device; and
   an intermediate shaft including a drive wheel connected to the auxiliary engine and permanently connected in terms of rotation to the primary shafts,
   in which the drive wheel is fixedly mounted on the intermediate shaft, which intermediate shaft includes a pair of fixed step-down pinions, one of the step-down pinions meshing with a fixed pinion belonging to the main primary shaft, and the other step-down pinion meshing with a fixed pinion belonging to the auxiliary primary shaft.

2. The drivetrain as claimed in claim 1, further comprising a computer-controlled transmission including at least one motorized actuator that controls the synchromeshes or the clutch device.

3. The drivetrain as claimed in claim 1, in which the clutch device has a main engaged position in which the main primary shaft is synchronized with the main engine, a neutral position in which no primary shaft is connected to the main engine, and an auxiliary engaged position in which the auxiliary primary shaft is synchronized with the main engine.

4. The drivetrain as claimed in claim 1, further comprising means for attaching the auxiliary engine, and in which the drive wheel and a rotor belonging to the auxiliary engine are connected by a chain.

5. The drivetrain as claimed in claim 1, in which a rotational speed of a rotor of the auxiliary engine is greater than a rotational speed of at least one of the primary shafts.

6. The drivetrain as claimed in claim 1, in which the main engine is a combustion engine and the auxiliary engine is a generator capable of converting mechanical energy into another form of energy.

7. A drivetrain for a motor vehicle, including a main engine, an auxiliary engine, and a parallel shaft transmission, which transmission includes at least one primary shaft connected to the main engine by a clutch device, at least one secondary shaft including a drive pinion meshing with a differential ring gear, an intermediate shaft that is not coaxial with the primary and secondary shafts, and a plurality of synchromeshes configured to selectively cause the primary shaft to rotate as one with the secondary shaft, the drivetrain comprising:
   a main primary shaft and an auxiliary primary shaft each selectively connected to the main engine by the clutch device; and
   an intermediate shaft including a drive wheel connected to the auxiliary engine and permanently connected in terms of rotation to the primary shafts,
   in which the intermediate shaft includes an intermediate reverse-gear pinion in mesh with a reverse-gear pinion mounted on the secondary shaft, a reverse-gear synchromesh being mounted on the secondary shaft.

8. The drivetrain as claimed in claim 7, in which a rotational speed of the drive wheel is greater than a rotational speed of the intermediate reverse-gear pinion.

9. The drivetrain as claimed in claim 7, in which the main engine is a combustion engine and the auxiliary engine is a generator capable of converting mechanical energy into another form of energy.

10. The drivetrain as claimed in claim 7, in which the drive wheel and a rotor belonging to the auxiliary engine are connected by a chain.

11. The drivetrain as claimed in claim 7, in which the clutch device has a main engaged position in which the main primary shaft is synchronized with the main engine, a neutral position in which no primary shaft is connected to the main engine, and an auxiliary engaged position in which the auxiliary primary shaft is synchronized with the main engine.

12. A drivetrain for a motor vehicle, including a main engine, an auxiliary engine, and a parallel shaft transmission, which transmission includes at least one primary shaft connected to the main engine by a clutch device, at least one secondary shaft including a drive pinion meshing with a differential ring gear, an intermediate shaft that is not coaxial with the primary and secondary shafts, and a plurality of synchromeshes configured to selectively cause the primary shaft to rotate as one with the secondary shaft, the drivetrain comprising:

a main primary shaft and an auxiliary primary shaft each selectively connected to the main engine by the clutch device;

an intermediate shaft including a drive wheel connected to the auxiliary engine and permanently connected in terms of rotation to the primary shafts;

a double dog-clutch synchromesh mounted on the secondary shaft contributing to reverse-gear ratios and to a first-gear ratio; and a freewheel interposed between a sliding gear of the synchromesh and a first-gear idler pinion, the first-gear pinion being the closest pinion on the secondary shaft to the drive pinion.

13. The drivetrain as claimed in claim 12, in which the main engine is a combustion engine and the auxiliary engine is a generator capable of converting mechanical energy into another form of energy.

14. The drivetrain as claimed in claim 12, in which the drive wheel and a rotor belonging to the auxiliary engine are connected by a chain.

15. The drivetrain as claimed in claim 12, in which the clutch device has a main engaged position in which the main primary shaft is synchronized with the main engine, a neutral position in which no primary shaft is connected to the main engine, and an auxiliary engaged position in which the auxiliary primary shaft is synchronized with the main engine.

16. A drivetrain for a motor vehicle, including a main engine, an auxiliary engine, and a parallel shaft transmission, which transmission includes at least one primary shaft connected to the main engine by a clutch device, at least one secondary shaft including a drive pinion meshing with a differential ring gear, an intermediate shaft that is not coaxial with the primary and secondary shafts, and a plurality of synchromeshes configured to selectively cause the primary shaft to rotate as one with the secondary shaft, the drivetrain comprising:

a main primary shaft and an auxiliary primary shaft each selectively connected to the main engine by the clutch device;

an intermediate shaft including a drive wheel connected to the auxiliary engine and permanently connected in terms of rotation to the primary shafts; and a double synchromesh and a single synchromesh of friction cone type mounted on one of the primary shafts, the double friction-type synchromesh contributing to at least three forward-gear ratios.

17. The drivetrain as claimed in claim 16, including five forward-gear ratios, in which the double friction-type synchromesh and a double dog-clutch synchromesh are actuated by a first motorized actuator with two different selection positions, in which the single friction-type synchromesh engages a second-gear pinion situated on the same side of the single synchromesh as the clutch device, the single synchromesh and the clutch device being actuated by a second motorized actuator.

18. The drivetrain as claimed in claim 16, including six forward-gear ratios, in which the double friction-type synchromesh and a double dog-clutch synchromesh are actuated by a first motorized actuator with two different selection positions, in which the single friction-type synchromesh engages a second-gear pinion situated on the opposite side of the single synchromesh with respect to the clutch device, the single synchromesh and the clutch device being actuated by a second motorized actuator with a same selection position.

19. The drivetrain as claimed in claim 16, in which the main engine is a combustion engine and the auxiliary engine is a generator capable of converting mechanical energy into another form of energy.

20. The drivetrain as claimed in claim 16, in which the drive wheel and a rotor belonging to the auxiliary engine are connected by a chain.

* * * * *